US011738955B1

(12) United States Patent
Wettersten

(10) Patent No.: US 11,738,955 B1
(45) Date of Patent: Aug. 29, 2023

(54) PALLET STACKING MACHINE

(71) Applicant: Kenth Wettersten, Marshville, NC (US)

(72) Inventor: Kenth Wettersten, Marshville, NC (US)

( * ) Notice: Subject to any disclaimer, the term of this patent is extended or adjusted under 35 U.S.C. 154(b) by 206 days.

(21) Appl. No.: 17/361,570

(22) Filed: Jun. 29, 2021

(51) Int. Cl.
| | |
|---|---|
| *B65G 57/30* | (2006.01) |
| *B66F 9/12* | (2006.01) |
| *B66F 9/22* | (2006.01) |
| *B66F 9/075* | (2006.01) |

(52) U.S. Cl.
CPC .......... *B65G 57/302* (2013.01); *B66F 9/0755* (2013.01); *B66F 9/12* (2013.01); *B66F 9/22* (2013.01); *B65G 2201/0267* (2013.01); *B65G 2203/0233* (2013.01)

(58) Field of Classification Search
CPC . B66F 9/0755; B66F 9/12; B66F 9/22; B65G 59/06; B65G 59/062; B65G 59/063; B65G 57/30; B65G 57/301; B65G 57/302; B65G 57/303
See application file for complete search history.

(56) References Cited

U.S. PATENT DOCUMENTS

| | | | |
|---|---|---|---|
| 4,187,570 A | | 2/1980 | Simone |
| 4,508,483 A | | 4/1985 | Hessling |
| 4,639,181 A | | 1/1987 | Tsubouchi |
| 4,701,092 A | * | 10/1987 | Reynaud ............... B65G 59/063 |
| | | | 414/796.1 |
| 4,741,414 A | | 5/1988 | Claassen |
| 5,503,247 A | | 4/1996 | MacLeod |
| 5,887,680 A | | 3/1999 | Carson |
| 5,951,238 A | | 9/1999 | Duecker |
| 7,201,555 B1 | | 4/2007 | Smith |
| 7,614,841 B2 | | 11/2009 | Friedrich |
| 7,744,335 B1 | | 6/2010 | Cleary |
| 9,963,333 B2 | | 5/2018 | Stone |
| 10,045,641 B2 | | 8/2018 | Taylor |
| 10,427,895 B2 | | 10/2019 | Redman |
| 2005/0220600 A1 | * | 10/2005 | Baker ................ B65G 1/04 |
| | | | 414/626 |
| 2016/0023852 A1 | | 1/2016 | Redman |
| 2017/0233199 A1 | * | 8/2017 | King ................ B65G 59/06 |
| | | | 414/789.7 |
| 2019/0382252 A1 | | 12/2019 | Meijer |

FOREIGN PATENT DOCUMENTS

| | | | | |
|---|---|---|---|---|
| WO | 9739968 | | 10/1997 | |
| WO | WO 97/39968 | * | 10/1997 | ............. B65Q 57/30 |

* cited by examiner

*Primary Examiner* — Lynn E Schwenning
(74) *Attorney, Agent, or Firm* — Kyle A. Fletcher, Esq.

(57) ABSTRACT

The pallet stacking machine comprises a pallet housing, a pallet lifter, a control unit, and operator controls. The pallet stacking machine may be operable to lift a pallet stack so that an individual pallet may be added to the bottom of the pallet stack. The pallet stacking machine may be operable to lift a subset of the pallet stack that excludes a bottom pallet so that the bottom pallet may be removed from the pallet stack. The individual pallets comprising the pallet stack may be of one or more sizes, shapes, forms, and materials. As non-limiting examples, the individual pallets comprising the pallet stack may comprise mixed dimensions such as 48 inch×48 inch pallets and 40 inch by 48 inch pallets, may comprise a mix of two-way entry pallets and four-way entry pallets, and may comprise a mix of pallet materials.

19 Claims, 7 Drawing Sheets

PALLET STACKING MACHINE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the fields of shipping and warehousing, more specifically, a pallet stacking machine.

SUMMARY OF INVENTION

The pallet stacking machine comprises a pallet housing, a pallet lifter, a control unit, and operator controls. The pallet stacking machine may be operable to lift a pallet stack so that an individual pallet may be added to the bottom of the pallet stack. The pallet stacking machine may be operable to lift a subset of the pallet stack that excludes a bottom pallet so that the bottom pallet may be removed from the pallet stack. The individual pallets comprising the pallet stack may be of one or more sizes, shapes, forms, materials, or combinations thereof. As non-limiting examples, the individual pallets comprising the pallet stack may comprise mixed dimensions such as 48 inch×48 inch pallets and 40 inch by 48 inch pallets, may comprise a mix of two-way entry pallets and four-way entry pallets, and may comprise a mix of pallet materials.

An object of the invention is to provide a pallet housing that defines a pallet-handling area and a pallet lifter operable to lift one or more pallets within the pallet-handing area.

Another object of the invention is to provide a pallet lifter comprising a pallet fork that is operable to extend into the pallet housing and to retract out of the pallet housing.

A further object of the invention is to provide a control unit and operator controls to control the movements of the pallet fork.

Yet another object of the invention is to load and unload pallets of one or more sizes into and out of a pallet stack from the bottom of the pallet stack.

It is also an objective of the invention to detect the height of the pallet stack and to prevent additional pallets from being added to the stack once the stack has reached a maximum allowable height.

These together with additional objects, features and advantages of the pallet stacking machine will be readily apparent to those of ordinary skill in the art upon reading the following detailed description of the presently preferred, but nonetheless illustrative, embodiments when taken in conjunction with the accompanying drawings.

In this respect, before explaining the current embodiments of the pallet stacking machine in detail, it is to be understood that the pallet stacking machine is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the pallet stacking machine.

It is therefore important that the claims be regarded as including such equivalent construction insofar as they do not depart from the spirit and scope of the pallet stacking machine. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
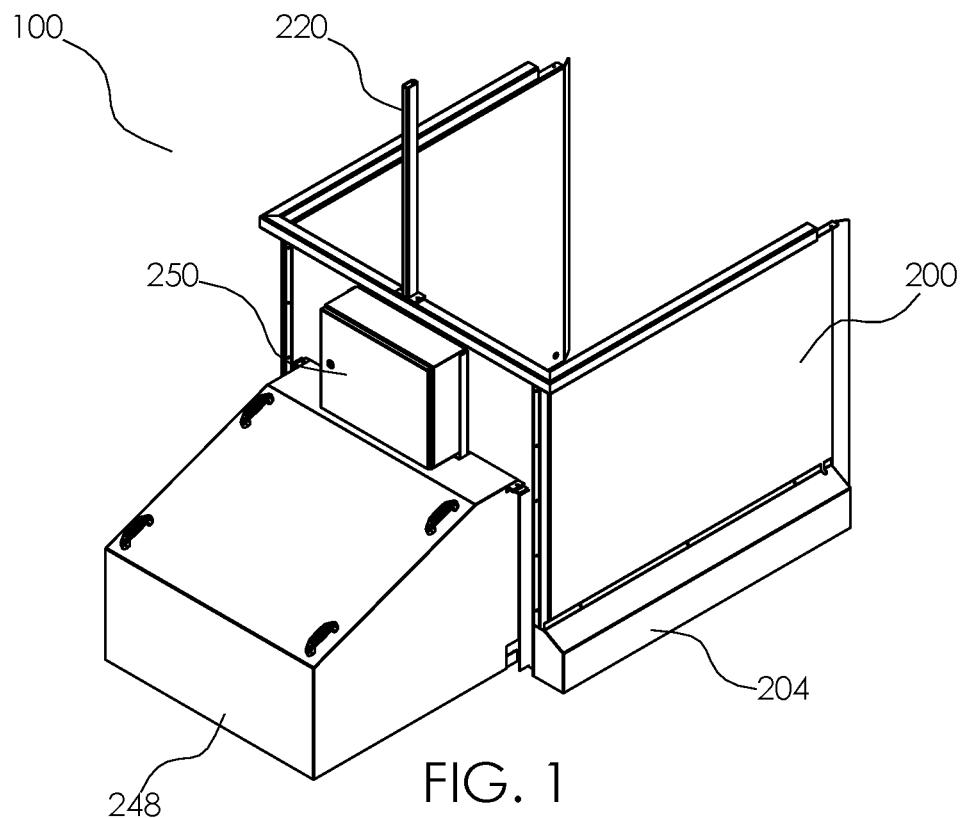
FIG. 1 is an isometric view of an embodiment of the disclosure.
Figure 2:
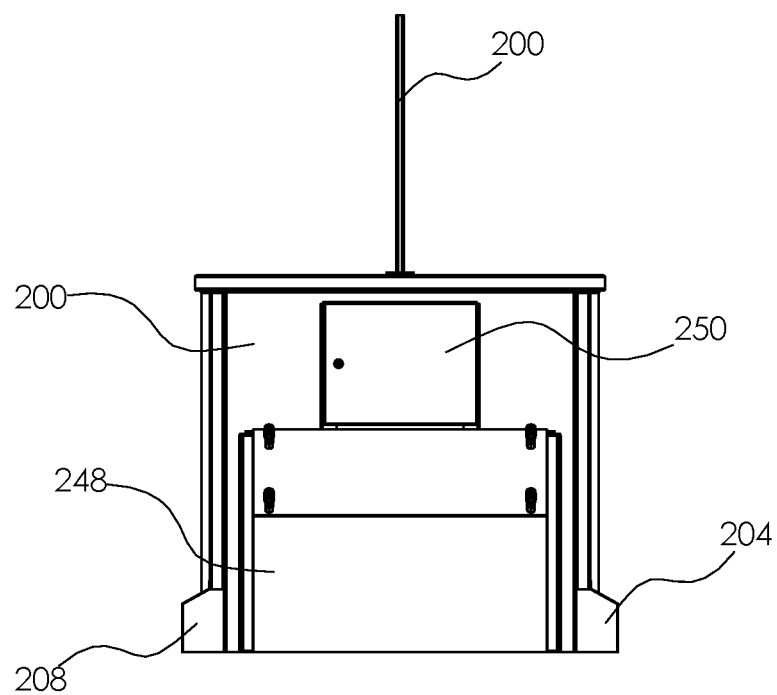
FIG. 2 is a rear view of an embodiment of the disclosure.
Figure 3:
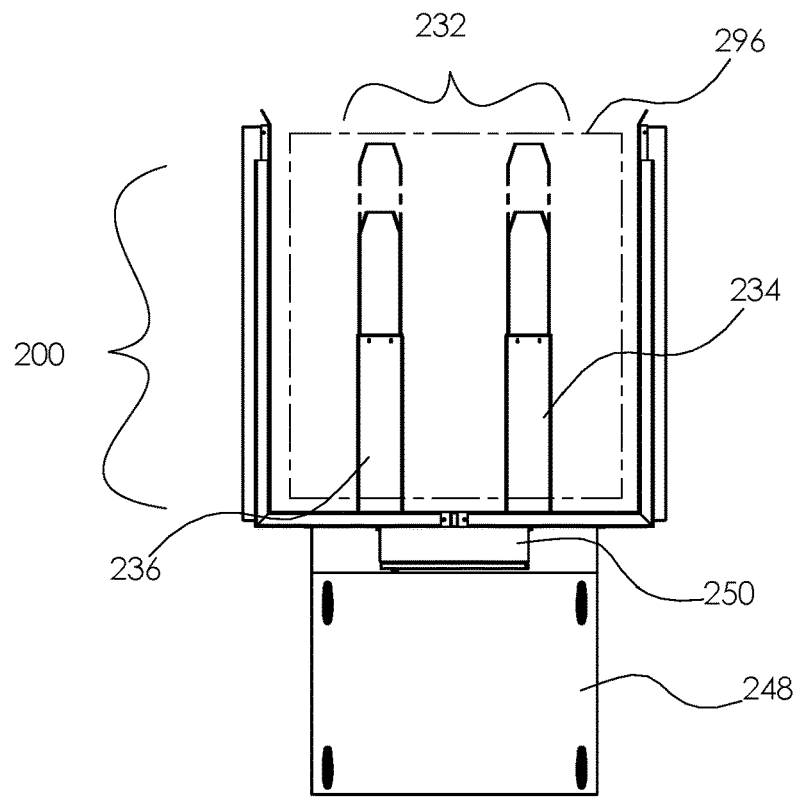
FIG. 3 is a top view of an embodiment of the disclosure.
Figure 4:
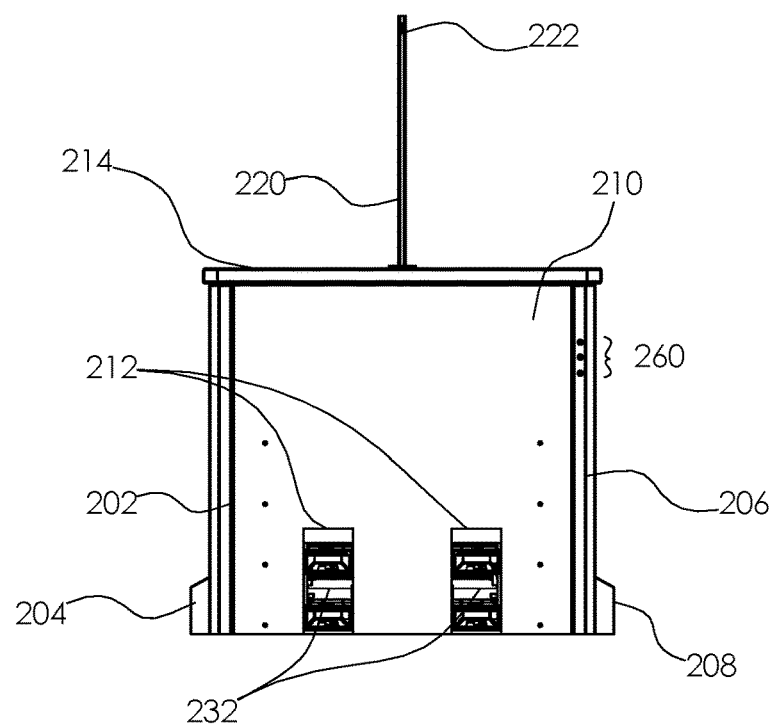
FIG. 4 is a front view of an embodiment of the disclosure.
Figure 5:
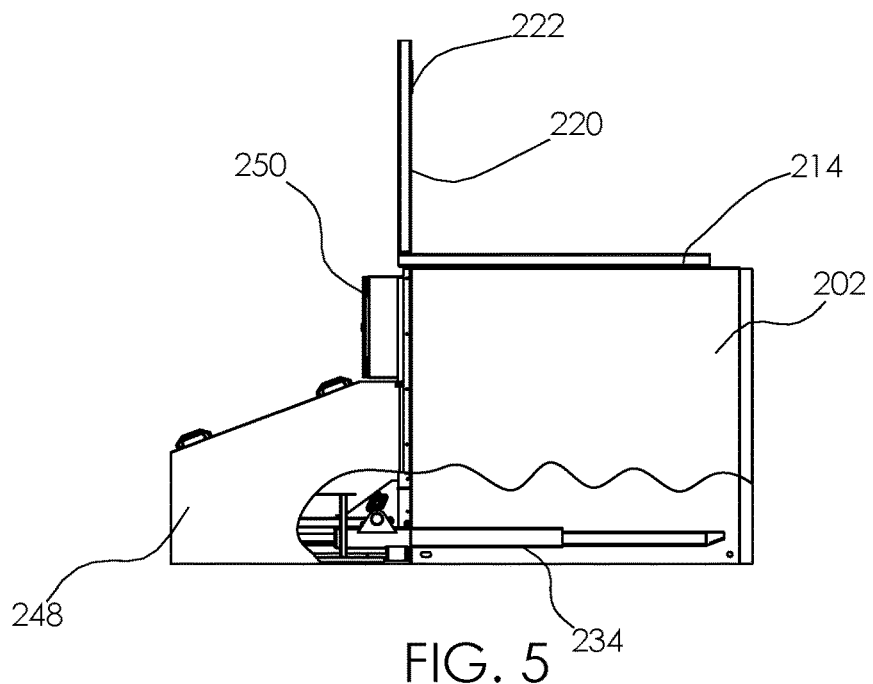
FIG. 5 is a detail side view of an embodiment of the disclosure illustrating the pallet fork at the first fork height (the lowest height).
Figure 6:
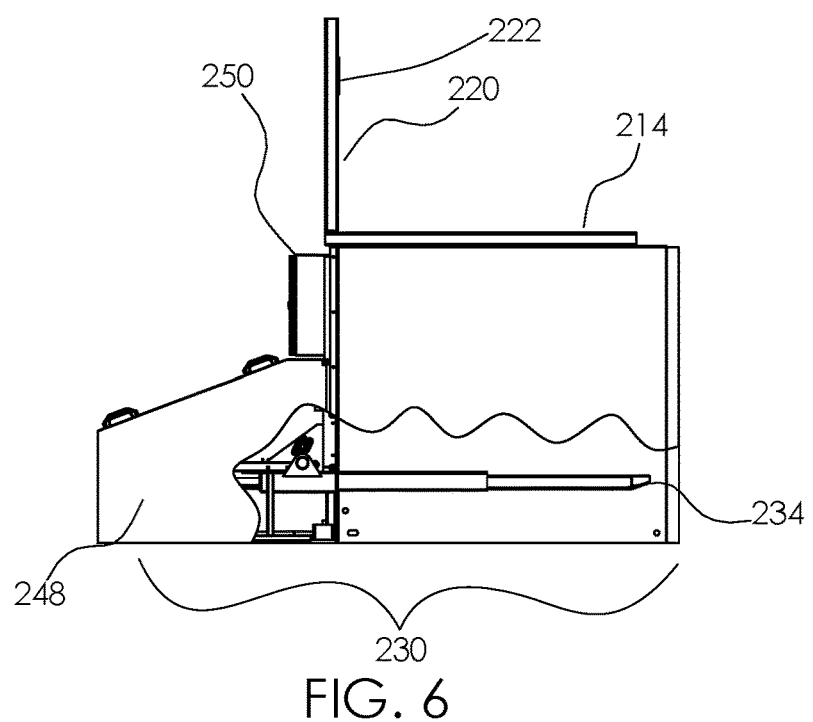
FIG. 6 is a detail side view of an embodiment of the disclosure illustrating the pallet fork at the third fork height (the highest height).
Figure 7:
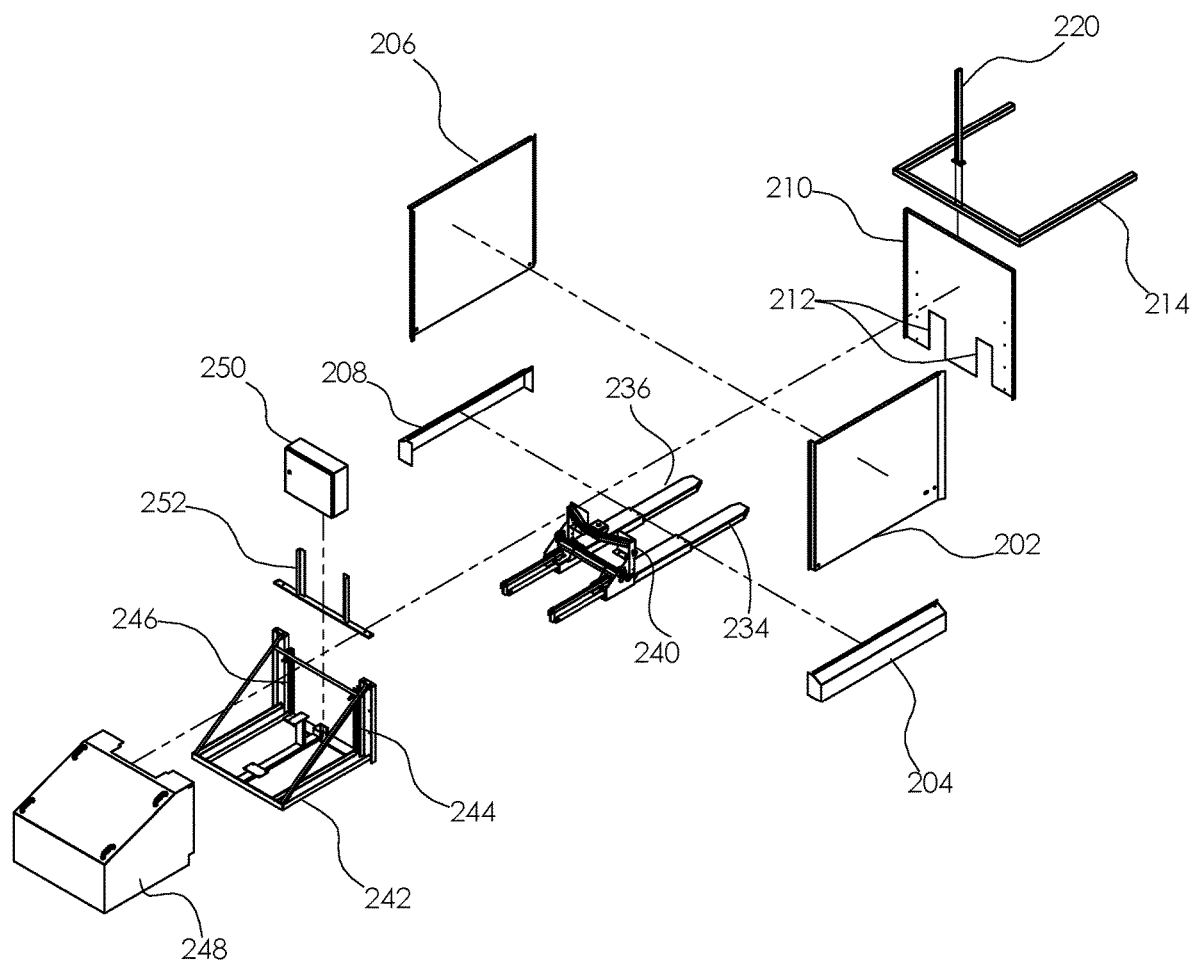
FIG. 7 is an exploded view of an embodiment of the disclosure.
Figure 8:
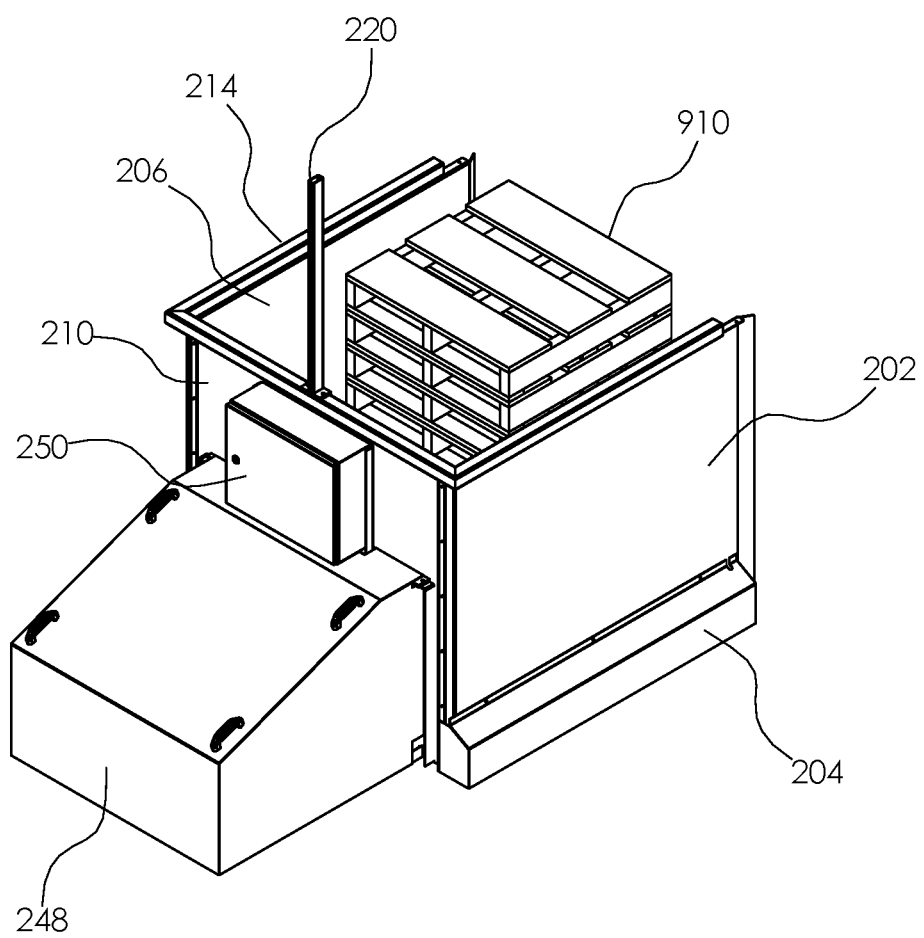
FIG. 8 is an in-use view of an embodiment of the disclosure illustrating a pallet stack within the pallet housing.
Figure 9:
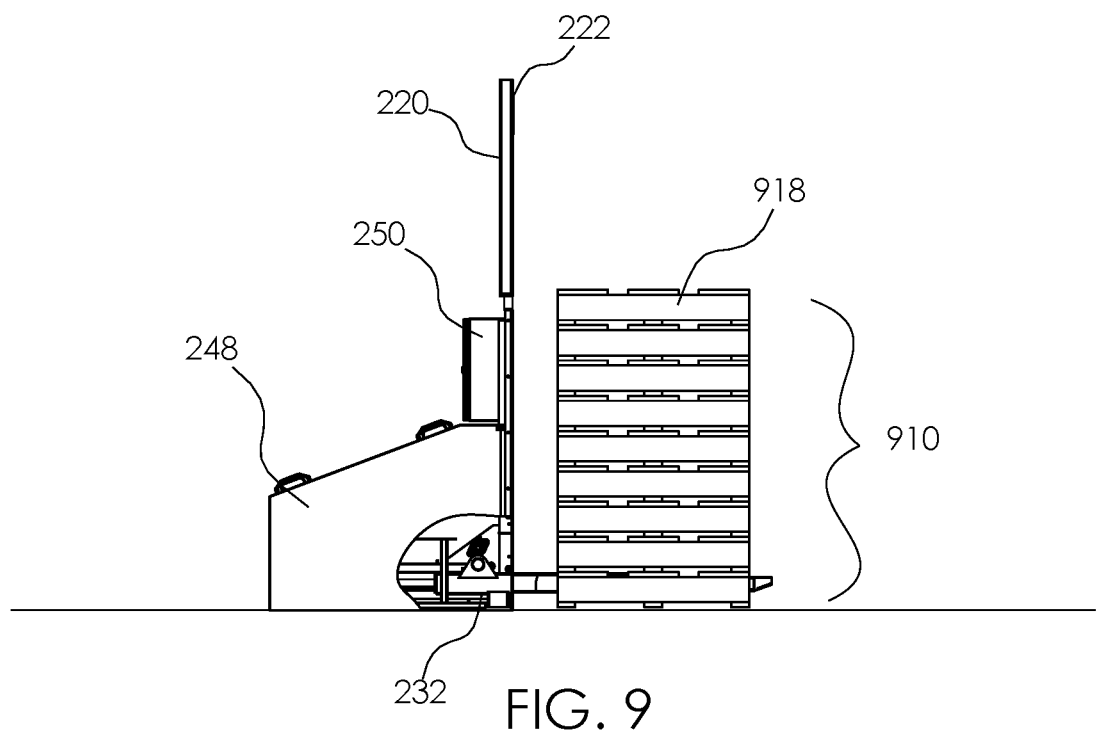
FIG. 9 is a detail view of an embodiment of the disclosure illustrating the pallet fork retracted.
Figure 10:
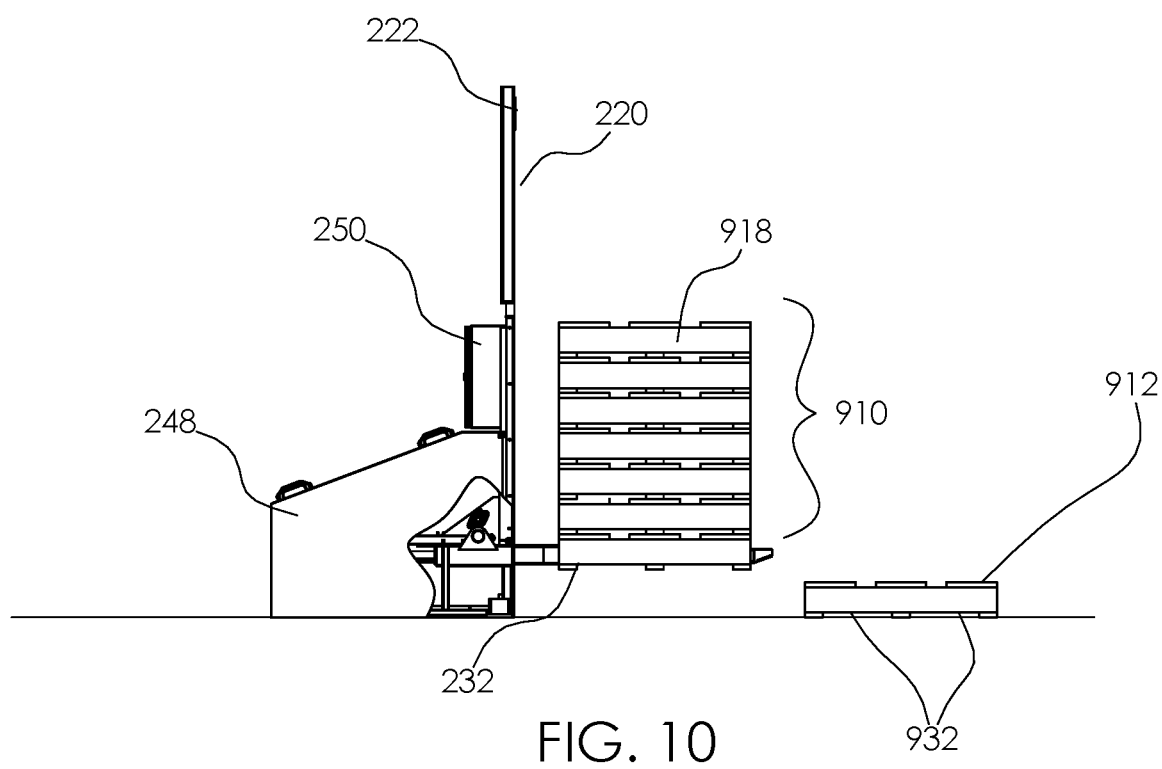
FIG. 10 is a detail view of an embodiment of the disclosure illustrating the pallet fork extended and lifting the pallet stack and a new pallet about to be slid under the pallet stack.
Figure 11:
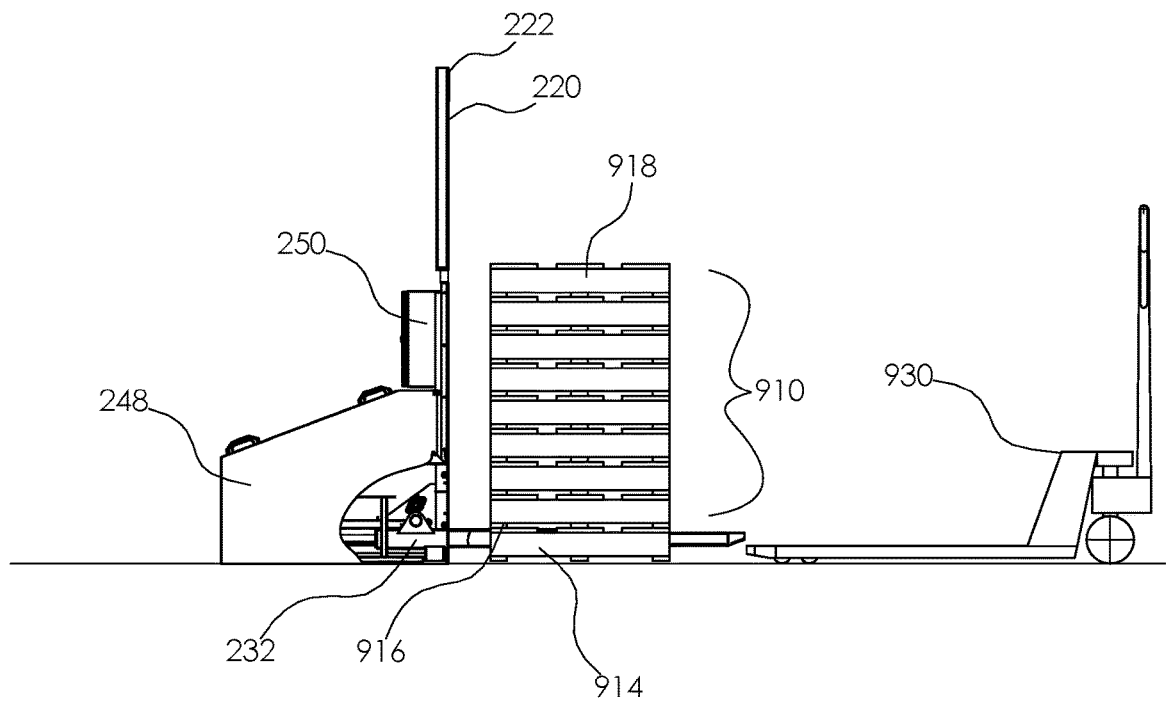
FIG. 11 is a detail view of an embodiment of the disclosure illustrating the pallet fork retracted and a pallet jack about to be placed under the pallet stack to remove the pallet stack from the pallet-handling area.
Figure 12:
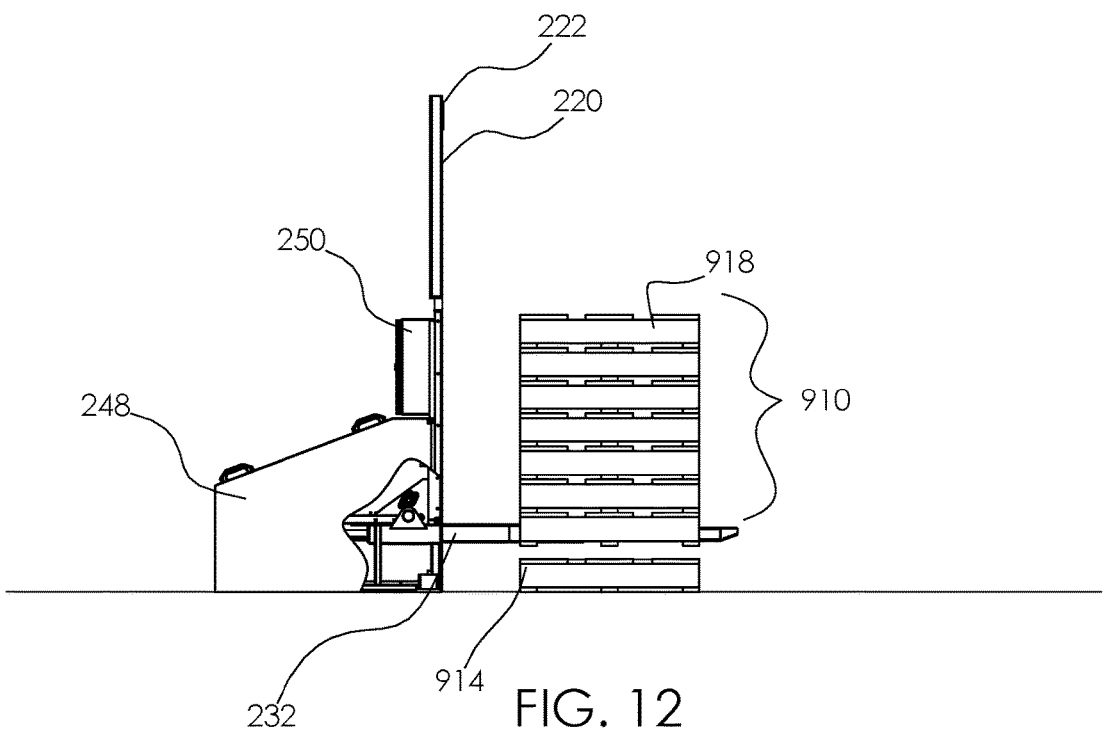
FIG. 12 is a detail view of an embodiment of the disclosure illustrating the pallet fork extended and lifting a subset of the pallet stack that excludes the bottom pallet so that the bottom pallet may be removed from the pallet stack.

Detailed reference will now be made to a first potential embodiment of the disclosure, which is illustrated in FIGS. 1 through 12.

The pallet stacking machine 100 (hereinafter invention) comprises a pallet housing 200, a pallet lifter 230, a control unit 250, and operator controls 260. The invention 100 may be operable to lift a pallet stack 910 so that an individual pallet may be added to the bottom of the pallet stack 910. The invention 100 may be operable to lift a subset of the pallet stack 910 that excludes a bottom pallet 914 so that the bottom pallet 914 may be removed from the pallet stack 910. The individual pallets comprising the pallet stack 910 may be of one or more sizes, shapes, forms, and materials. As non-limiting examples, the individual pallets comprising the pallet stack 910 may comprise mixed dimensions such as 48 inch×48 inch pallets and 40 inch by 48 inch pallets, may comprise a mix of two-way entry pallets and four-way entry pallets, and may comprise a mix of pallet materials such as wooden pallets, plastic pallets, and aluminum pallets.

Note that throughout the remainder of this specification directional references such as left and right are stated as if the reader is standing adjacent to the pallet housing 200 and looking towards the pallet lifter 230. In this referential framework, front refers to the pallet housing 200 end of the invention 100 and rear refers to a lifter housing 248 end of the invention 100.

References to "pallet jack" throughout this document are intended to comprise any mechanism capable of moving an individual pallet or a pallet stack. As non-limiting examples, "pallet jack" may refer to a hand-operated pallet jack, a motorized pallet jack, a pallet truck, a high-lift pallet jack, a fork lift, and so on.

The pallet housing 200 may comprise a left housing wall 202, a right housing wall 206, and a rear housing wall 210. The pallet housing 200 may define a pallet-handling area 296 that is rectangular when seen from above. The individual pallets may be added to the pallet stack 910 and removed from the pallet stack 910 within the pallet-handling area 296. The pallet housing 200 may be adapted to prevent injury by shielding a user from the pallet-handling area 296. The pallet housing 200 may serve as a centering guide for the individual pallets that are being added to the pallet stack 910. As a non-limiting example, the user may be able to visually judge whether pallets are centered within the pallet-handling area 296 based upon perceived distance between the individual pallet and the left housing wall 202 and perceived distance between the individual pallet and the right housing wall 206. The left housing wall 202 and the right housing wall 206 may be vertically oriented panels located on the left side and right side of the pallet housing 200, respectively. The left housing wall 202 and the right housing wall 206 may be oriented to run from front to rear. The rear housing wall 210 may be a vertically oriented panel located at the rear of the pallet-handling area 296 and oriented to run from left to right. The left side of the rear housing wall 210 may be coupled to the rear of the left housing wall 202 and the right side of the rear housing wall 210 may be coupled to the rear of the right housing wall 206.

In some embodiments, the left housing wall 202 may comprise a lower left side cover 204 and the right housing wall 206 may comprise a lower right side cover 208. The lower left side cover 204 and the lower right side cover 208 may be coupled to the outside bottom of the left housing wall 202 and to the outside bottom of the right housing wall 206, respectively. The lower left side cover 204 and the lower right side cover 208 may increase stability of the left housing wall 202 and the right housing wall 206 by increasing the footprint of the left housing wall 202 and the right housing wall 206. It shall be noted that the lower left side cover 204 and the lower right side cover 208 may be used as a cover for the photocell sensor that is a safety controller.

The rear housing wall 210 may comprise a pair of arm notches 212. The pair of arm notches 212 may be cutouts made at the bottom of the rear housing wall 210. The pair of arm notches 212 may extend vertically upward from the bottom edge of the rear housing wall 210. The pair of arm notches 212 may provide access for a pallet fork 232 of the pallet lifter 230 to reach into the pallet-handling area 296. The separation of the pair of arm notches 212, as measured between the centers of the pair of arm notches 212, may be the same as the separation of a left arm 234 and a right arm 236 on the pallet fork 232, as measured between the centers of the left arm 234 and the right arm 236. The width of an individual notch selected from the pair of arm notches 212 may be wider than the width of the left arm 234 and may be wider than the width of the right arm 236. The height of the individual notch selected from the pair of arm notches 212 may be higher than the maximum upward travel of the pallet fork 232 such that the pallet fork 232 may travel upward without interference from the rear housing wall 210.

The pallet housing 200 may further comprise a top support 214. The top support 214 may be a U-shaped armature that may be coupled to the tops of the left housing wall 202, the right housing wall 206 and the rear housing wall 210. The top support 214 may increase stability of the pallet housing 200 by preventing bending of the top of the pallet housing 200.

The pallet housing 200 may further comprise one or more height detection armatures 220. The one or more height detection armatures 220 may be one or more vertically-oriented armatures that may be coupled to the top of the top support 214. The one or more height detection armatures 220 may house one or more height sensors 222 at a height where the one or more height sensors 222 may detect the top of the pallet stack 910 when the pallet stack 910 reaches a maximum allowable height.

The one or more height sensors 222 may be one or more sensors that are operable to detect the pallet stack 910 when the pallet stack 910 has risen to a height that places a top pallet 918 in front of the one or more height sensors 222. As non-limiting examples, the one or more height sensors 222 may detect the presence of the top pallet 918 in front of the one or more height sensors 222 using optical technologies, ultrasonic technologies, RF technologies, capacitive technologies, inductive technologies, or combinations thereof.

The pallet lifter 230 may comprise the pallet fork 232, a lifter frame 242, and the lifter housing 248. The pallet lifter 230 may be operable to raise and lower the pallet stack 910.

The pallet fork 232 may comprise the left arm 234, the right arm 236, and an arm frame 240. The left arm 234 and the right arm 236 may be coupled to the arm frame 240 to establish a separation and orientation for the left arm 234 and the right arm 236. The left arm 234 may be parallel to the right arm 236. The arm frame 240 may be movably coupled to the lifter frame 242 such that the pallet fork 232 may be raised and lowered vertically relative to the lifter frame 242.

The left arm 234 and the right arm 236 may be telescopic such that the horizontal length of the left arm 234 and the right arm 236 may be varied. An individual arm selected from the left arm 234 and the right arm 236 may be shortened by telescopically collapsing narrower sections of the individual arm into wider sections of the individual arm. The individual arm may be shortened such that the individual arm does not extend through the pair of arm notches 212. The individual arm may be lengthened by telescopically extending narrower sections of the individual arm out of wider sections of the individual arm. The individual arm may be lengthened such that the individual arm extends into the pallet-handling area 296. The left arm 234 and the right arm 236 may be shortened and lengthened simultaneously such that the left arm 234 and the right arm 236 maintain equal lengths. Shortening the left arm 234 and the right arm 236 such that the pallet fork 232 does not reach into the pallet-handling area 296 may be referred to as retracting the pallet fork 232. Lengthening the left arm 234 and the right arm 236 such that the pallet fork 232 reaches into the pallet-handling area 296 may be referred to as extending the pallet fork 232.

The pallet fork 232 may be raised and lowered, either continuously or in discrete steps, to at least three heights:

A first fork height may be a height that aligns the left arm 234 and the right arm 236 with pallet jack openings 932 of the bottom pallet 914 of the pallet stack 910. The left arm 234 and the right arm 236 may be extended into the bottom pallet 914 at the first fork height.

A second fork height may be a height that is higher than the first fork height and that aligns the left arm 234 and the right arm 236 with pallet jack openings 932 of a pallet immediately above the bottom pallet 916. The left arm 234 and the right arm 236 may be extended into the pallet immediately above the bottom pallet 916 at the second fork height.

A third fork height may be a height that is higher than the second fork height and that lifts the pallet stack 910 above the bottom pallet 914 such that the bottom pallet 914 may be moved horizontally without interference from the pallet stack 910 above, even when the bottom pallet 914 is elevated by a pallet jack 930. In other words, the third fork height provides clearance for both the bottom pallet 914 and the wheels of the pallet jack 930 to move freely beneath the pallet stack 910.

The individual arms may be extended and retracted and the pallet fork 232 may be raised and lowered on the lifter frame 242 using actuators that may be electrical or hydraulic in nature. As non-limiting examples, the actuators may be electrical motors, electrical linear actuators, hydraulic pistons, or combinations thereof. In a preferred embodiment, hydraulic actuators may be used to extend and retract the left arm 234 and the right arm 236 and to raise and lower the pallet fork 232.

The lifter frame 242 may be a support structure for the pallet fork 232. The lifter frame 242 may comprise a left track 244 and a right track 246 which may be vertically-oriented tracks for guiding up and down movements of the arm frame 240. The lifter housing 248 may cover the lifter frame 242 and the actuators for safety and to protect the mechanism.

The control unit 250 may control the movements of the pallet fork 232 for the purposes of loading and unloading the individual pallets. The operator controls 260 may be adapted for the user to instruct the control unit 250 regarding desired movements of the pallet fork 232. The control unit 250 may be coupled to the rear housing wall 210 via a control unit mounting armature 252.

The operator controls 260 may comprise hand or foot operated controls. The control unit 250 and the operator controls 260 may be adapted to provide the user with sequenced operation, non-sequenced operation, or combinations thereof. As a non-limiting example, for embodiments providing sequenced operation the operator controls 260 may correspond to the tasks of loading a new pallet 912 to the pallet stack 910, removing the bottom pallet 914 from the pallet stack 910, and returning the pallet fork 232 to a home position where the left arm 234 and the right arm 236 are retracted into the lifter housing 248. As a further non-limiting example, for embodiments providing non-sequenced operation the operator controls 260 may correspond to movements of the pallet fork 232 such as UP, DOWN, EXTEND, and RETRACT.

The new pallet 912 is loaded to the pallet stack 910 by retracting the pallet fork 232, lowering the pallet fork 232 to the first fork height, extending the pallet fork 232, lifting the pallet fork 232 to the third fork height thus lifting the pallet stack 910, moving the new pallet 912 into position in the pallet-handling area 296 under the pallet stack 910 using the pallet jack 930, lowering the pallet fork 232 to the second fork height, and retracting the pallet fork 232. The bottom pallet 914 is unloaded from the pallet stack 910 by retracting the pallet fork 232, moving the pallet fork 232 to the second fork height, extending the pallet fork 232, lifting the pallet fork 232 to the third fork height thus lifting the pallet stack 910, moving the new pallet 912 out of the pallet-handling area 296 using the pallet jack 930, lowering the pallet fork 232 to the first fork height, and retracting the pallet fork 232. When the pallet fork 232 is retracted, the pallet stack 910 may be moved out of the pallet-handling area 296 or into the pallet-handling area 296 using the pallet jack 930.

In use, the pallet stack 910 may be started by using the operator controls 260 to retract the pallet fork 232 and by placing an individual pallet into the pallet-handling area 296. A new pallet 912 may be loaded into the pallet stack 910 by using the operator controls 260 to lift the pallet stack 910, by placing the new pallet 912 in the pallet-handling area 296 under the pallet stack 910 using the pallet jack 930, and by lowering the pallet stack 910 onto the new pallet 912. The bottom pallet 914 may be unloaded from the pallet stack 910 by using the operator controls 260 to lift the pallet stack 910 except for the bottom pallet 914, by removing the bottom pallet 914 from the pallet-handling area 296 using the pallet jack 930, and by lowering the pallet stack 910 onto the floor. The last step in any operation may generally include retracting the pallet fork 232.

DEFINITIONS

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" may refer to top and "lower" may refer to the bottom. As a non-limiting example, the upper end of a vertical shaft is the top end of the vertical shaft.

As used herein, the words "control" or "controls" are intended to include any device which can cause the completion or interruption of an electrical circuit; non-limiting examples of controls include toggle switches, rocker switches, push button switches, rotary switches, electromechanical relays, solid state relays, touch sensitive interfaces and combinations thereof whether they are normally open, normally closed, momentary contact, latching contact, single pole, multi-pole, single throw, or multi-throw.

As used in this disclosure, the word "correspond" indicates that a first object is in some manner linked to a second object in a one to one relationship or that one or more properties shared by two or more objects match, agree, or align within acceptable manufacturing tolerances.

As used herein, the words "couple", "couples", "coupled" or "coupling", may refer to connecting, either directly or indirectly, and does not necessarily imply a mechanical connection.

As used in this disclosure, "horizontal" may be a directional term that refers to a direction that is perpendicular to the local force of gravity. Unless specifically noted in this disclosure, the horizontal direction is always perpendicular to the vertical direction.

As used in this disclosure, a "housing" may be a rigid or semi-rigid casing that encloses and protects one or more devices.

As used in this disclosure, a "notch" may be an indentation formed in an edge or a cavity or aperture formed within a surface.

As used in this disclosure, "orientation" may refer to the positioning and/or angular alignment of a first object relative to a second object or relative to a reference position or reference direction.

As used herein, a "pallet" may be a shipping platform to which a cargo is fastened. The pallet make it easier for a forklift to move the cargo by providing a space for the forks to slide under the cargo. Pallets are generally made of wood or plastic. A typical pallet has three or four evenly spaced stringer boards oriented in a vertical direction with five to ten deck planks attached across the top of all three stringers and a smaller number of planks attached across the bottom of the three stringers. Common sizes for pallets in the U.S. include 40 in wide by 48 in long and 48 in wide by 48 in long. A common height for a pallet is approximately 5 in high. A "skid" may be similar to a pallet except that a skid does not have the planks on the underside of the stringers.

As used herein, "rectangle" and "rectangular" may refer to a closed figure comprising four straight lines joined by four right angles. The opposing sides of a rectangle have equal length. A square is considered a special type of rectangle where all four sides are the same length.

As used herein, "RF" may refer to Radio Frequency. In general, an alternating electromagnetic field may be considered to be a radio frequency if the oscillation rate is between approximately 20 kHz and 300 GHz.

As used herein, "sequenced operation" and "non-sequenced operation" may refer to modes of operation of a machine. As a sequenced operation, the operator of the machine may activate a control that causes the machine to perform a task or a subset of a task by completing a sequence of operations involving the machine without intervention. As a non-sequenced operation, the operator of the machine may be required to repeatedly activate controls that step the machine through completion of the task or subset of the task. As non-limiting examples, sequenced operation may permit the operator to press a START button and have the machine produce a leather strap for a belt complete with 5 evenly spaced holes at one end of the strap. Non-sequenced operation may require that the operator repeatedly activate controls to position the leather strap and to activate a punch for each of the five holes.

As used in this disclosure, "telescopic", "telescoping", and "telescopically" may refer to an object made of sections that fit or slide into each other such that the object can be made longer or shorter by adjusting the relative positions of the sections.

As used in this disclosure, a "track" may be a device that is used to control the path of motion of an object in at least one dimension.

As used in this disclosure, "vertical" may refer to a direction that is parallel to the local force of gravity. Unless specifically noted in this disclosure, the vertical direction is always perpendicular to horizontal.

With respect to the above description, it is to be realized that the optimum dimensional relationship for the various components of the invention described above and in FIGS. 1 through 12, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A pallet stacking machine comprising:
a pallet housing, a pallet lifter, a control unit, and operator controls;
wherein the pallet stacking machine is operable to lift a pallet stack so that an individual pallet is added to the bottom of the pallet stack;
wherein the pallet stacking machine is operable to lift a subset of the pallet stack that excludes a bottom pallet so that the bottom pallet is removed from the pallet stack;
wherein the individual pallets comprising the pallet stack are of one or more sizes, shapes, forms, materials, or combinations thereof;
wherein a rear housing wall of the pallet housing includes a pair of arm notches;
wherein the pair of arm notches are cutouts made at a bottom of the rear housing wall;
wherein the pair of arm notches extend vertically upward from a bottom edge of the rear housing wall;
wherein the pair of arm notches provide access for a pallet fork of the pallet lifter to reach into the pallet-handling area.

2. The pallet stacking machine according to claim 1
wherein the pallet housing comprises a left housing wall, the right housing wall, and a rear housing wall;
wherein the pallet housing defines a pallet-handling area that is rectangular when seen from above;
wherein the individual pallets are added to the pallet stack and removed from the pallet stack within the pallet-handling area;
wherein the pallet housing is adapted to prevent injury by shielding a user from the pallet-handling area;

wherein the pallet housing serves as a centering guide for the individual pallets that are being added to the pallet stack.

3. The pallet stacking machine according to claim 2
wherein the left housing wall and the right housing wall are vertically oriented panels located on the left side and right side of the pallet housing, respectively;
wherein the left housing wall and the right housing wall are oriented to run from front to rear;
wherein the rear housing wall is a vertically oriented panel located at the rear of the pallet-handling area and oriented to run from left to right;
wherein the left side of the rear housing wall is coupled to the rear of the left housing wall and the right side of the rear housing wall is coupled to the rear of the right housing wall.

4. The pallet stacking machine according to claim 3
wherein the left housing wall comprises a lower left side cover and the right housing wall comprises a lower right side cover;
wherein the lower left side cover and the lower right side cover are coupled to the outside bottom of the left housing wall and to the outside bottom of the right housing wall, respectively;
wherein the lower left side cover and the lower right side cover increase stability of the left housing wall and the right housing wall by increasing the footprint of the left housing wall and the right housing wall.

5. The pallet stacking machine according to claim 4
wherein the separation of the pair of arm notches, as measured between the centers of the pair of arm notches, is the same as the separation of a left arm and a right arm on the pallet fork, as measured between the centers of the left arm and the right arm;
wherein the width of an individual notch selected from the pair of arm notches is wider than the width of the left arm and wider than the width of the right arm;
wherein the height of the individual notch selected from the pair of arm notches is higher than the maximum upward travel of the pallet fork such that the pallet fork travels upward without interference from the rear housing wall.

6. The pallet stacking machine according to claim 5
wherein the pallet housing further comprises a top support;
wherein the top support is a U-shaped armature that is coupled to the tops of the left housing wall, the right housing wall and the rear housing wall;
wherein the top support increases stability of the pallet housing by preventing bending of the top of the pallet housing.

7. The pallet stacking machine according to claim 6
wherein the pallet housing further comprises one or more height detection armatures;
wherein the one or more height detection armatures are one or more vertically-oriented armatures that are coupled to the top of the top support;
wherein the one or more height detection armatures house one or more height sensors at a height where the one or more height sensors detect the top of the pallet stack when the pallet stack reaches a maximum allowable height.

8. The pallet stacking machine according to claim 7
wherein the one or more height sensors are one or more sensors that are operable to detect the pallet stack when the pallet stack has risen to a height that places a top pallet in front of the one or more height sensors.

9. The pallet stacking machine according to claim 8
wherein the one or more height sensors detect the presence of the top pallet in front of the one or more height sensors using optical technologies, ultrasonic technologies, RF technologies, capacitive technologies, inductive technologies, or combinations thereof.

10. The pallet stacking machine according to claim 8
wherein the pallet lifter comprises the pallet fork, a lifter frame, and a lifter housing;
wherein the pallet lifter is operable to raise and lower the pallet stack.

11. The pallet stacking machine according to claim 10
wherein the pallet fork comprises the left arm, the right arm, and an arm frame;
wherein the left arm and the right arm are coupled to the arm frame to establish a separation and orientation for the left arm and the right arm;
wherein the left arm is parallel to the right arm;
wherein the arm frame is movably coupled to the lifter frame such that the pallet fork is raised and lowered vertically relative to the lifter frame.

12. The pallet stacking machine according to claim 11
wherein the left arm and the right arm are telescopic such that the horizontal length of the left arm and the right arm are variable;
wherein an individual arm selected from the left arm and the right arm are shortened by telescopically collapsing narrower sections of the individual arm into wider sections of the individual arm;
wherein the individual arm is operable to shorten such that the individual arm does not extend through the pair of arm notches;
wherein the individual arm is lengthened by telescopically extending narrower sections of the individual arm out of wider sections of the individual arm;
wherein the individual arm is operable to lengthen such that the individual arm extends into the pallet-handling area;
wherein the left arm and the right arm are shortened and lengthened simultaneously such that the left arm and the right arm maintain equal lengths.

13. The pallet stacking machine according to claim 12
wherein the pallet fork is operable to raise and lower to at least three heights;
wherein a first fork height is a height that aligns the left arm and the right arm with pallet jack openings of the bottom pallet of the pallet stack;
wherein the left arm and the right arm are extendable into the bottom pallet at the first fork height;
wherein a second fork height is a height that is higher than the first fork height and that aligns the left arm and the right arm with pallet jack openings of a pallet immediately above the bottom pallet;
wherein the left arm and the right arm are extendable into the pallet immediately above the bottom pallet at the second fork height;
wherein a third fork height is a height that is higher than the second fork height and that lifts the pallet stack above the bottom pallet such that the bottom pallet is movable horizontally without interference from the pallet stack above, even when the bottom pallet is elevated by a pallet jack.

14. The pallet stacking machine according to claim 13
wherein the individual arms are extended and retracted and the pallet fork is raised and lowered on the lifter frame using actuators.

15. The pallet stacking machine according to claim 14 wherein the actuators are hydraulic actuators.

16. The pallet stacking machine according to claim 14 wherein the lifter frame is a support structure for the pallet fork;
wherein the lifter frame comprises a left track and a right track which are vertically-oriented tracks for guiding up and down movements of the arm frame;
wherein the lifter housing covers the lifter frame and the actuators.

17. The pallet stacking machine according to claim 16 wherein the control unit controls the movements of the pallet fork;
wherein the operator controls are adapted for the user to instruct the control unit regarding movements of the pallet fork.

18. The pallet stacking machine according to claim 17 wherein the operator controls comprise hand or foot operated controls;
wherein the control unit and the operator controls are adapted to provide the user with sequenced operation, non-sequenced operation, or combinations thereof.

19. The pallet stacking machine according to claim 17 wherein a new pallet is loaded to the pallet stack by retracting the pallet fork, lowering the pallet fork to the first fork height, extending the pallet fork, lifting the pallet fork to the third fork height, moving the new pallet into position in the pallet-handling area under the pallet stack, lowering the pallet fork to the second fork height, and retracting the pallet fork;
wherein the bottom pallet is unloaded from the pallet stack by retracting the pallet fork, moving the pallet fork to the second fork height, extending the pallet fork, lifting the pallet fork to the third fork height, moving the new pallet out of the pallet-handling area, lowering the pallet fork to the first fork height, and retracting the pallet fork.

\* \* \* \* \*